United States Patent
Kanai

[11] Patent Number: 6,118,585
[45] Date of Patent: *Sep. 12, 2000

[54] OPTICAL SYSTEM FOR OBSERVING EQUIPMENT HAVING IMAGE-VIBRATION COMPENSATION SYSTEM

[75] Inventor: Moriyasu Kanai, Tokyo, Japan

[73] Assignee: Asahi Kogaku Kogyo Kabushiki Kaisha, Tokyo, Japan

[*] Notice: This patent is subject to a terminal disclaimer.

[21] Appl. No.: 09/222,886

[22] Filed: Dec. 30, 1998

[30] Foreign Application Priority Data

Jan. 6, 1998 [JP] Japan ................... 10-001172

[51] Int. Cl.⁷ ................... G02B 27/64; G02B 23/00
[52] U.S. Cl. ................... 359/557; 359/407; 359/554; 359/432
[58] Field of Search ................... 359/554–557, 359/407, 421–422, 431–432, 676–678, 683, 689–690, 784–785; 396/52–55; 348/208

[56] References Cited

U.S. PATENT DOCUMENTS

| | | | |
|---|---|---|---|
| 5,461,513 | 10/1995 | Maruyama | 359/557 |
| 5,490,014 | 2/1996 | Suzuki | 359/557 |
| 5,530,594 | 6/1996 | Shibayanma | 359/690 |
| 5,694,244 | 12/1997 | Abe et al. | 359/422 |
| 5,754,339 | 5/1998 | Kanai et al. | 359/557 |
| 5,771,119 | 6/1998 | Kang | 359/432 |

FOREIGN PATENT DOCUMENTS

| | | | |
|---|---|---|---|
| 61-156019 | 7/1986 | Japan | 359/431 |
| 6-43365 | 2/1994 | Japan . | |
| 6308431 | 11/1994 | Japan . | |
| 10-20213 | 1/1998 | Japan . | |
| 10186228 | 7/1998 | Japan . | |

*Primary Examiner*—Thong Nguyen
*Attorney, Agent, or Firm*—Greenblum & Bernstein, P.L.C.

[57] ABSTRACT

An optical system for a binocular is provided with an objective optical system, an erecting system and an eyepiece. The objective optical system includes a first lens having positive refractive power, a second lens having negative refractive power and a third lens having positive refractive power. The third lens is movable in a direction orthogonal to an optical axis to stabilize an image. The objective optical system satisfies the following relationships:

$$0.05 < d_{12}/f_0 < 0.20;\text{ and}$$

$$0.5 < |\tan 1°/(\phi_{13}-\phi_{12})< 5.0\ (\text{unit: mm})$$

where $d_{12}$ is a distance between the first lens and the second lens, $f_0$ is the focal length of the objective optical system, $\phi_{12}$ is a composite power of the first and second lenses, and $\phi_{13}$ is a composite power of the first, second and third lenses.

4 Claims, 10 Drawing Sheets

—— d-line
······ g-line
—·— C-line

FIG.7B

—— d-line
······ g-line
—·— C-line

— d-line
····· g-line
—·— C-line

FIG.10B

— d-line
····· g-line
—·— C-line

FIG.13A

— d-line
····· g-line
—·— C-line

FIG.13B

— d-line
····· g-line
—·— C-line

FIG.11

OPTICAL SYSTEM FOR OBSERVING EQUIPMENT HAVING IMAGE-VIBRATION COMPENSATION SYSTEM

BACKGROUND OF THE INVENTION

The present invention relates to an optical system for an observing equipment such as a binocular or a terrestrial telescope that has an image-vibration compensation system.

Recently, binoculars provided with image-vibration compensation systems for preventing vibration of observed image due to a hand-held shake of a user have been developed. Japanese Laid Open Publication No. HEI 6-43365 discloses an image-vibration compensation system of a binocular that employs a variable angle prism for each of telescopic optical systems of the binocular. A variable angle prism is located between an objective lens and an erecting system. When the optical system vibrates due to a hand-held shake of a user, the vertex angle of the variable angle prism is controlled to stabilize the image.

In such a construction, however, since the variable angle prism is located in the convergent light, if the vertex angle of the prism is changed, decentering coma occurs largely.

Another example of the image-vibration compensation system for binoculars is disclosed in Japanese Laid Open Publication No HEI 6-308431. The binocular in the publication employs a compensation device that is attached in front of the objective optical systems of the binocular. Since the first lens of the objective optical system has the largest diameter in the telescopic optical system, in general, and the device is arranged in front of the first lenses, the device becomes large in size, which increases the size of the binocular.

SUMMARY OF THE INVENTION

It is therefore an object of the present invention to provide an optical system of an observing equipment having image-vibration compensation system, which is compact in size.

For the above object, according to the present invention, there is provided an optical system of an observing equipment having an image-vibration compensation system. The optical system includes an objective optical system that includes:

a first lens having positive refractive power;

a second lens having negative refractive power; and a third lens having positive refractive power, the lenses being arranged in that order from an object side, wherein the third lens is a compensation lens that is movable in a direction perpendicular to an optical axis of the objective optical system to compensate for vibration of an image due to a hand-held shake, and $$0.05 < d_{12}/f_o < 0.20 \quad (1)$$

$$0.5 < |\tan 1°/(\phi_{13} - \phi_{12})| < 5.0 \text{ (unit: mm)} \quad (2)$$

where, $d_{12}$ is a distance between the first lens and the second lens, $f_o$ is the focal length of the objective optical system, that is, $f_o$ is the resultant focal length of the first, second and third lenses, $\phi_{12}$ is a composite power of the first and second lenses, and $\phi_{13}$ is a composite power of the first, second and third lenses.

With this construction, the compensation element is a part of the objective optical system located at the image side in the objective optical system, the size of the compensation element becomes smaller than the conventional element which is located at the object side of the objective optical system.

Optionally, the optical system may further include an eyepiece through which a user observes an image formed by the objective optical system. The optical system may still further include and erecting system that is located between the objective optical system and the eyepiece.

DESCRIPTION OF THE EMBODIMENTS

Figure 1:
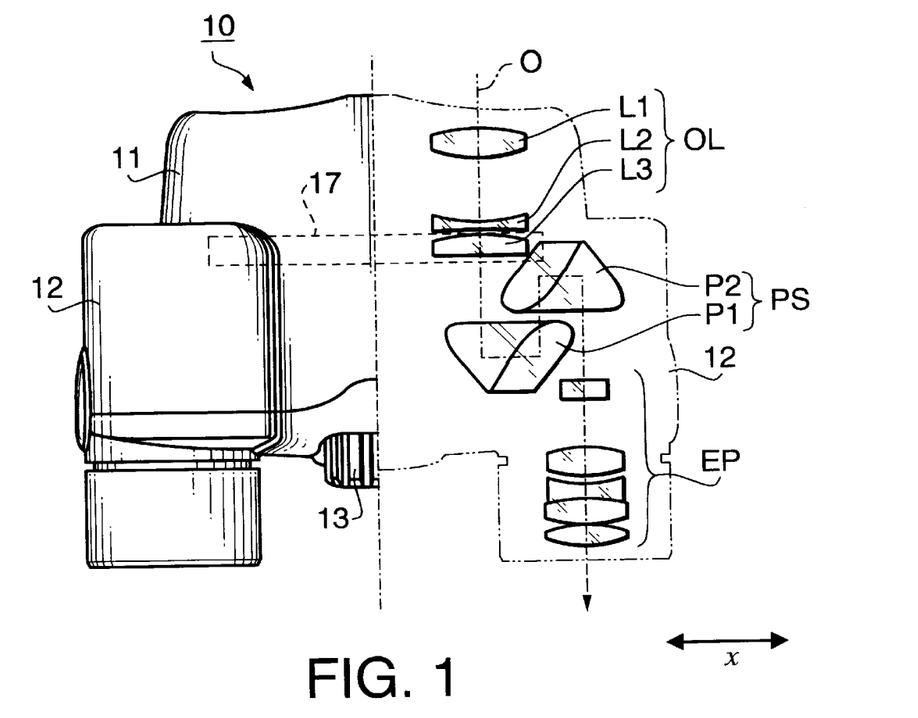
FIG. 1 is a plane view of a binocular that employs an optical system of the present invention with showing one of two telescopic optical systems.
Figure 2:
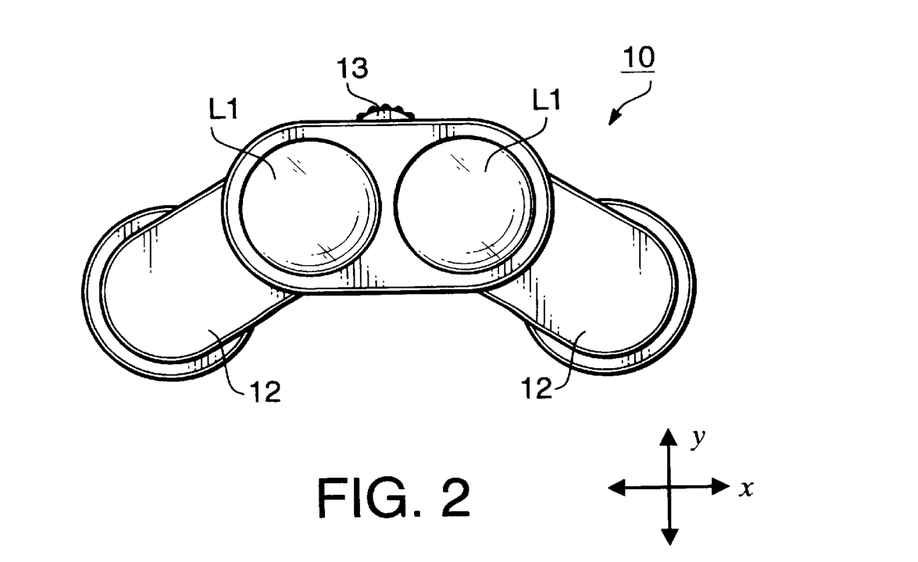
FIG. 2 is a front view of the binocular shown in FIG. 1.

FIG. 1 shows a binocular 10 that employs a pair of telescopic optical systems according to the invention. The binocular 10 also employs an image-vibration compensation system. FIG. 2 shows a front view of the binocular 10. The binocular 10 includes a center body 11 and a pair of grip portions 12 that are connected to the center body 11 at right and left side thereof, respectively. The grip portions 12 are rotatable with respect to the center body 11 in order to adjust a distance therebetween to fit a pupil distance of a user. A diopter adjusting dial 13 is attached to a rear portion of the center body 11.

The binocular 10 is provided with right and left telescopic optical systems arranged side by side for right and left eyes of the user. Since the left telescopic optical system is symmetric to the right telescopic optical system, FIG. 1 shows elements included in the right telescopic optical system, and description is directed thereto.

The telescopic optical system consists of an objective optical system OL for forming an image of an object, an erecting system PS for erecting the image, and an eyepiece EP.

The objective optical-system OL, which is provided in the center body 11, includes: a first lens L1 having positive refractive power; a second lens L2 having negative refractive power; and a third lens L3 having positive refractive power. The first to third lenses L1, L2 and L3 are arranged in this order from an object side.

The third lens L3 is mounted on a driving mechanism 17 that moves the third lens L3 in first and second directions perpendicular to an optical axis O of the objective optical system OL.

The objective optical system OL forms an inverted image, and the inverted image is erected into proper orientation through the erecting system PS. The erecting system PS is provided with a first prism P1 and a second prism P2, which constitute type II Porro prism system. The first prism P1 has two reflection surfaces for rotating the image by 90 degrees; and the second prism PS2 also has two reflection surfaces for further rotating the image by 90 degrees.

The eyepiece EP has five lenses though which a user observes the erected image by the erecting system PS. The objective optical system OL and the first prism P1 are arranged in the center body 11, and the second prism P2 and the eyepiece EP are arranged in the grip portion 12.

The grip portion 12 is rotatable, with respect to the center body 11, about the optical axis O of the objective optical system OL. The erecting system PS and the eyepiece EP are rotated together with the grip portion 12. The left and right grip portions rotate in the opposite directions, and the user can adjust the distance between the left and right eyepieces to correspond to the pupil distance of the user.

In this specification, an x-axis direction that is the first direction and a y-axis direction that is the second direction are defined with respect to the binocular 10. The y-axis direction is defined as a direction that is perpendicular to a plane including the optical axes O of both the right and left telescopic optical systems. The x-axis direction is defined as a direction, which is parallel to a plane perpendicular to the optical axis O, and is perpendicular to the y-axis direction. Thus, the x-axis and y-axis are perpendicular to each other, and both are perpendicular to the optical axis O.

The driving mechanism 17 drives the third lens L3 in the x-axis and y-axis directions such that the image viewed by a user is stabilized even when a hand-held shake is applied to the binocular 10.

At the initial or neutral position of the third lens L3, the optical axis of the third lens L3 is coincident with the optical axis O of the first and second lenses L1 and L2.

When the object side of the binocular 10 moves, relatively to the eyepiece side, in the y-axis direction due to a hand-held shake, the driving mechanism 17 moves the third lens L3 in the y-axis direction so that a position of an image is maintained. Similarly, when the object side of the binocular 10 moves, relatively to the eyepiece side, in the x-axis direction due to the hand-held shake, the driving mechanism 17 moves the third lens L3 in the x-axis direction so that the image position is maintained. In this specification, the angle formed between the optical axes O before and after the binocular 10 has been moved in the y-axis direction is referred to as a tilt angle in the y-axis direction, and the angle formed between the optical axes O before and after the binocular 10 has been moved in the x-axis direction is referred to as a tilt angle in the x-axis direction. It should be noted that the hand-held shake applied to the binocular 10 can be represented by the tilt angle(s) in the x-axis and/or y-axis directions, and accordingly, the image can be stabilized by moving the third lens L3 in the x-axis and/or y-axis direction.

Figure 3:
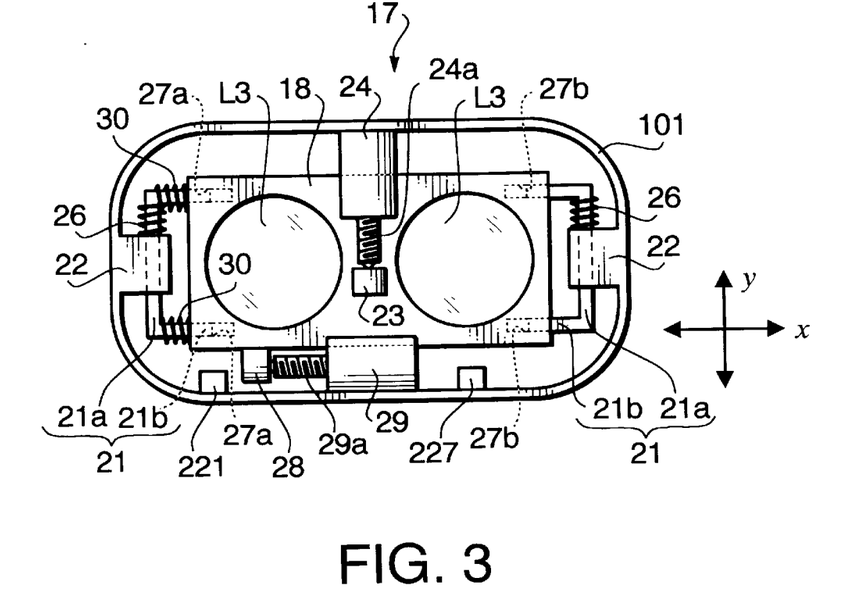
FIG. 3 schematically shows a structure of the driving mechanism shown in FIG. 1.

FIG. 3 shows an example of the driving mechanism 17 for driving the third lens L3.

The driving mechanism 17 includes a rectangular lens frame 18 that holds the third lenses L3 of both the telescopic optical systems at openings formed thereon, a first actuator 24 for linearly shifting the rectangular lens frame 18 in the y-axis direction and a second actuator 29 for linearly shifting the frame 18 in the x-axis direction.

At longitudinal side ends of the lens frame 18, a pair of guide bars 21 and 21 are provided The guide bar 21 has a center bar 21a and edge bars 21b formed at both edges of the center bar 21a. Both of the edge bars 21b are perpendicular to the center bar 21a and are directed to the same direction. The guide bars 21 and 21 are arranged such that the center bars 21a and 21a are parallel to the y-axis and that the tip ends of the edge bars 21b and 21b are faced to the rectangular lens frame 18.

The center bars 21a and 21a of the guide bars 21 and 21 are slidably fitted in through-holes formed in a pair of supports 22 and 22 that are formed inside the body 101 of the binocular.

The tip ends of the edge bars 21b of the one guide bars 21 are slidably inserted into holes 27a and 27a formed at one side end of the rectangular lens frame 18. The tip ends of the edge bars 21b of the other guide bars 21 are slidably inserted into holes 27b and 27b formed at the opposite side end of the rectangular lens frame 18.

With this structure, the lens frame 18 is movable in the y-axis direction and in the x-axis direction.

The first and second actuators 24 and 29 are secured on the inner surface of the body 101 of the binocular. A plunger 24a of the first actuator 24 is capable of protruding/retracting in the y-axis direction. The plunger 24a abuts a projection 23 formed on the lens frame 18 between the pair of third lenses L3. Further, coil springs 26 and 26 are provided to the center bars 21a and 21a to bias the lens frame 18 in the upward direction in FIG. 3 with respect to the body 101 of the binocular.

A plunger 29a of the second actuator 29 is capable of protruding/retracting in the x-axis direction. The plunger 29a abuts a projection 28 formed on the side of the lens frame 18. The coil springs 30 and 30 are provided to the edge bars 21b and 21b of the one guide bar 21 to bias the lens frame 18 in the rightward direction in FIG. 3.

When electrical power is applied to the first actuator 24 to make the plunger 24a protrude, the plunger 24a pushes the projection 23 to linearly move the rectangular lens frame 18 in the downward direction in FIG. 3. When the electrical power for retracting the plunger 24a is applied to the actuator 24, due to force of the coil springs 26, the projection 23 is kept contacting the plunger 24a, i.e., the lens frame 18 moves in the upward direction in FIG. 3.

In the same manner, when the electrical power is applied to the second actuator 29 to make the plunger 29a protrude, the projection 28 is pushed to linearly move the rectangular lens frame 18 in the leftward direction in FIG. 3. When the electrical power for retracting the plunger 29a is applied, the lens frame 18 moves in the rightward direction in FIG. 3 due to force of the coil springs 30 and 30.

When the third lens L3 is moved in the y-axis direction, the image in the user view moves in the vertical (up/down) direction. Accordingly, by controlling the first actuator 24, the vertical movement of the image due to the vertical hand-held shake can be compensated, while by controlling the second actuator 29, the horizontal movement of the image due to the horizontal hand-held shake can be compensated.

Further, the driving mechanism 17 is provided with an x-direction position sensor 221 and a y-direction position sensor 227 that are also secured to the body 101 of the binocular. The position sensor may be an optical sensor having a light emitting element and a position sensitive device (PSD).

Figure 4:
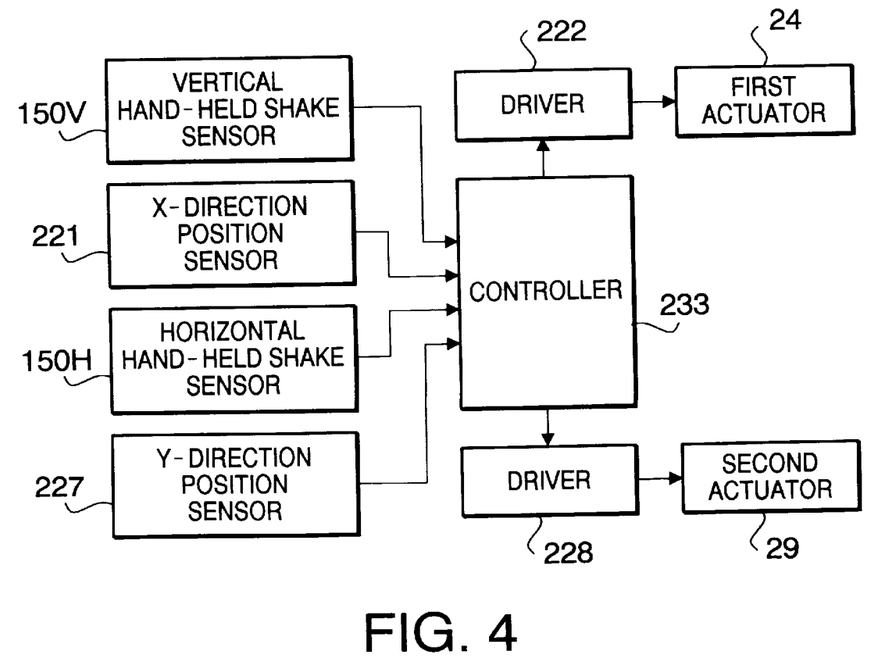
FIG. 4 is a block diagram illustrating a control system for controlling the driving mechanism.

As shown in FIG. 4, the first and second actuators 24 and 19 are controlled by a controller 233 through drivers 222 and 228, respectively. The controller 233 controls the drivers 222 and 228 based on the signals from a vertical hand-held shake sensor 150V, a horizontal hand-held shake sensor 150H, the x-direction position sensor 221, and the y-direction position sensor 227.

The controller 233 calculates amount of movements of the binocular in the vertical and horizontal directions due to the hand-held shake, and controls the drivers 222 and 228 to drive the first and second actuators 24 and 29 by an amount corresponding to the amount of movement of the image due to the hand-held shake. Specifically, the controller 233 determines a target position to which the lens frame 18 is to be positioned for canceling change of the position of the image due to the hand-held shake based on the amount of movement detected by the hand-held shake sensors 150V and 150H. Then, the controller 233 controls the driver to move the lens frame 18 to the calculated target position with monitoring the position detected by the position sensors 221 and 227. As the above control is continuously executed, the controller 233 continuously updates the target position, and accordingly, the image vibration due to the hand-held shake is compensated.

According to the embodiment, the telescopic optical system satisfies conditions (1) and (2):

$$0.05 < d_{12}/f_o < 0.20 \quad (1)$$

$$0.5 < |\tan 1°/(\phi_{13}-\phi_{12})| < 5.0 \text{ (unit: mm)} \quad (2)$$

where, $d_{12}$ is a distance between the first lens and the second lens $f_o$ is the focal length of the objective optical system, $\phi_{12}$ is a composite power of the first and second lenses, and $\phi_{13}$ is a composite power of the first, second and third lenses.

Condition (1) defines a range of a distance between the first and second lenses L1 and L2 of the objective optical system OL as compared with the focal length of the objective optical system OL. If condition (1) is satisfied, the diameters of the third lenses, which is a compensation lens, is sufficiently small, which allows compact construction of the compensation system. If the ratio is smaller than the lower limit, the diameter of the third lens must become too large to make the compensation system be compact. If the ratio is larger than the upper limit, difference between the incident height of a ray to the first lens and the incident height of the ray to the second lens becomes so large that spherical aberration and axial chromatic aberration become too large to compensate, and lateral chromatic aberration also becomes large.

Condition (2) defines a range of a decentering sensitivity, which is defined as a decentering amount of the third lens L3 to stabilize an image when the tilt angle of the optical system is 1 degree. If condition (2) is satisfied, the decentering sensitivity of the third lens L3 falls within a suitable range for compensating the trembling of the image due to the hand-held shake. If the ratio is smaller than the lower limit, the decentering sensitivity is too large to control. If the ratio is larger than the upper limit, the decentering sensitivity is too small, which increases the size of the driving mechanism.

In the image-vibration compensation system of the lens decentering type, inertial mass of the compensation lens should be as small as possible to lower load for the driving mechanism. Thus, it is preferable that the compensation lens consists of a plastic lens that is light in weight as compared with a glass lens.

Further, a lens having large spherical aberration generates large decentering coma when the lens is decentered due to image-vibration compensation. Thus the spherical aberration of the compensation lens should be as small as possible. Since the compensation lens consists of a single lens (L3), it is preferable that the third lens L3 is an aspherical lens of which thickness at periphery is larger than a spherical lens having same axial radius of curvature in order to correct spherical aberration. From this view point, the plastic lens is preferable because it is easy to form an aspherical surface through injection molding.

Numerical Embodiments

Hereafter, numerical embodiments of the telescopic optical systems will be described with reference to FIGS. 5 through 13.

First Embodiment

Figure 5:
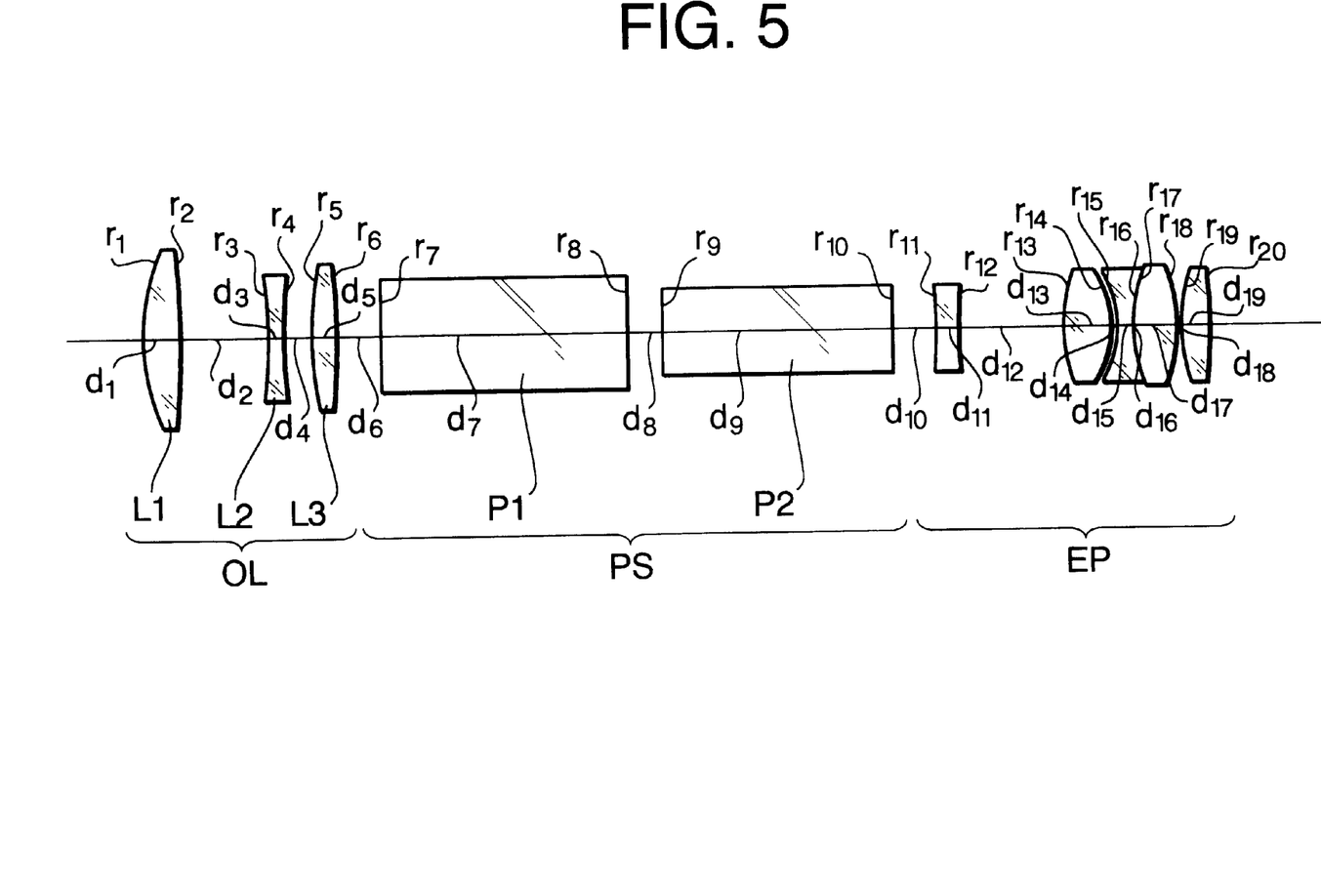
FIG. 5 is a lens diagram showing a telescopic optical system according to a first embodiment.

FIG. 5 shows a telescopic optical system according to a first embodiment and the numerical construction thereof is described in TABLE 1. The objective optical system OL includes three lenses L1 through L3. The third lens L3 is a compensation lens. The third lens L3 is a plastic lens having aspherical surfaces. The prisms P1 and P2 of the erecting system PS are shown as plane parallel plates in FIG. 5.

In TABLE 1, r (mm) denotes a radius of curvature of a surface (the values at the vertex for aspherical surfaces), d (mm) denotes a distance between the surfaces along the optical axis, n denotes a refractive index at a wavelength of 588 nm and vd denotes an Abbe number.

TABLE 1

| Surface Number | r | d | n | vd |
| --- | --- | --- | --- | --- |
| #1 | 30.000 | 4.800 | 1.51633 | 64.1 |
| #2 | −111.871 | 12.000 | | |
| #3 | −37.700 | 1.800 | 1.64769 | 33.8 |
| #4 | 44.770 | 4.000 | | |
| #5 | 60.000 | 3.000 | 1.52580 | 56.3 |
| #6 | −101.037 | 6.570 | | |
| #7 | INFINITY | 34.000 | 1.56883 | 56.3 |
| #8 | INFINITY | 4.500 | | |
| #9 | INFINITY | 32.000 | 1.56883 | 56.3 |
| #10 | INFINITY | 5.800 | | |
| #11 | −93.620 | 4.000 | 1.49176 | 57.4 |
| #12 | 93.620 | 14.830 | | |
| #13 | 23.936 | 6.770 | 1.49176 | 57.4 |

TABLE 1-continued

| Surface Number | r | d | n | vd |
|---|---|---|---|---|
| #14 | −10.075 | 0.700 | | |
| #15 | −11.190 | 2.000 | 1.58547 | 29.9 |
| #16 | 25.294 | 0.200 | | |
| #17 | 24.157 | 6.200 | 1.49176 | 57.4 |
| #18 | −15.260 | 0.500 | | |
| #19 | 22.703 | 3.500 | 1.60311 | 60.7 |
| #20 | −75.123 | — | | |

The object side surface #5 of the third lens L3 is an aspherical surface. Further, surfaces #12 and #14 of the eyepiece EP are also aspherical surfaces. An aspherical surface is expressed by the following equation:

$$X(h) = \frac{h^2 C}{1 + \sqrt{1 - (1+K)h^2 C^2}} + A_4 h^4 + A_6 h^6 + A_8 h^8 + A_{10} h^{10}$$

where, X(h) is a SAG, that is, a distance of a curve from a tangential plane at a point on the surface where the height from the optical axis is h. C is a curvature (1/r) of the vertex of the surface, K is a conic constant, $A_4$, $A_6$, $A_8$ and $A_{10}$ are aspherical surface coefficients of fourth, sixth, eighth and tenth orders. The constant K and coefficient $A_4$ are indicated in TABLE 2. In the embodiments, coefficients $A_6$, $A_8$ and $A_{10}$ are equal to zero.

TABLE 2

| 5th surface | K = 0.00000 | $A_4 = -0.14000 \times 10^{-5}$ |
| 12th surface | K = 0.00000 | $A_4 = -0.12000 \times 10^{-4}$ |
| 14th surface | K = −1.00000 | $A_4 = -0.46000 \times 10^{-5}$ |

Figure 6A:
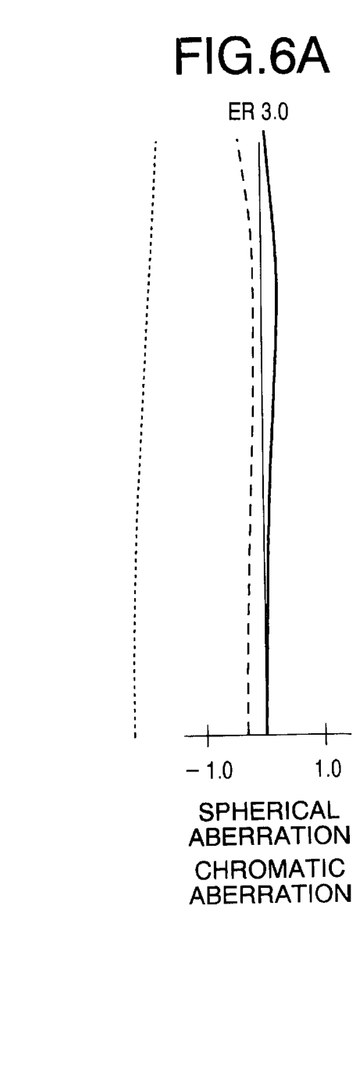
FIGS. 6A through 6D show various aberrations of the telescopic optical system shown in FIG. 5.
Figure 6B:
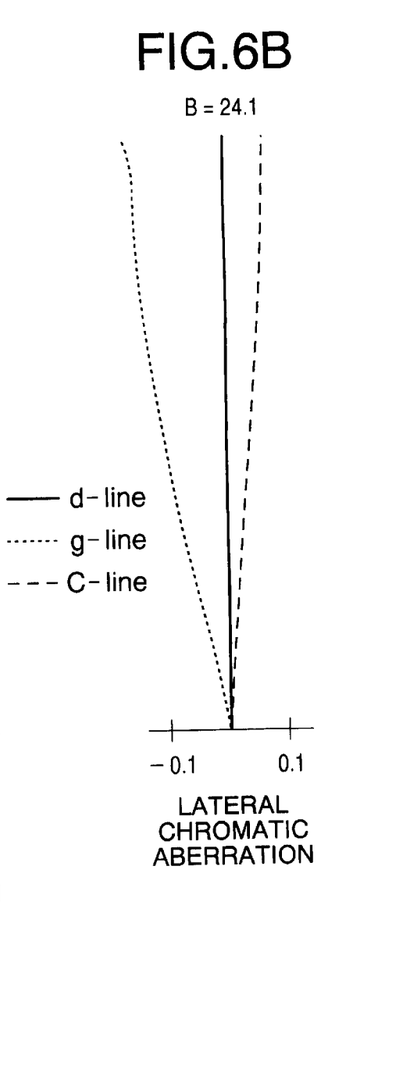
Figure 6C:
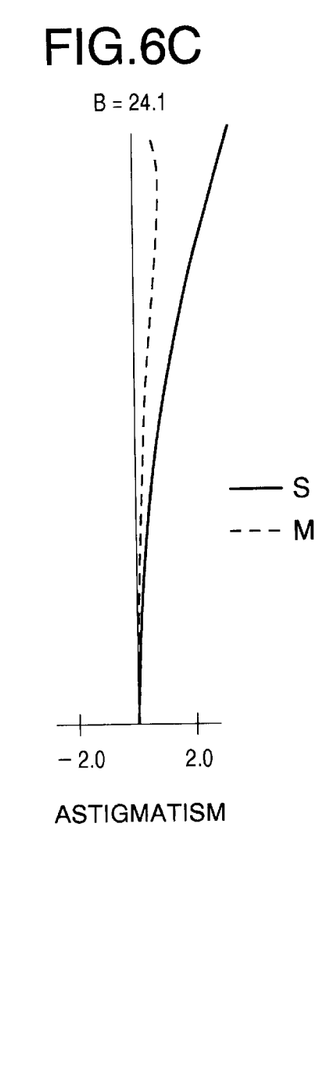

FIGS. 6A through 6D show third order aberrations of the telescopic optical system according to the first embodiment:

FIG. 6A shows spherical aberrations at d-line (588 nm), g-line (436 nm) and C-line (656 m);

FIG. 6B shows a lateral chromatic aberration at the same wavelengths as in FIG. 6A;

FIG. 6C shows an astigmatism (S: Sagittal, M: Meridional); and

Figure 6D:
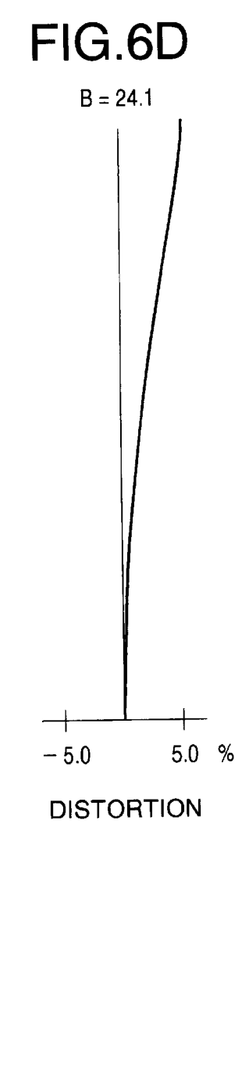

FIG. 6D shows distortion.

The vertical axis in FIG. 6A represents a diameter of an eye ring, and the vertical axes in FIGS. 6B through 6D respectively represent an angle B formed between the exit ray from the eyepiece and the optical axis. Unit of the horizontal axis is "mm" in each of FIGS. 6A through 6C, and is "percent" in FIG. 6D.

Figure 7A:
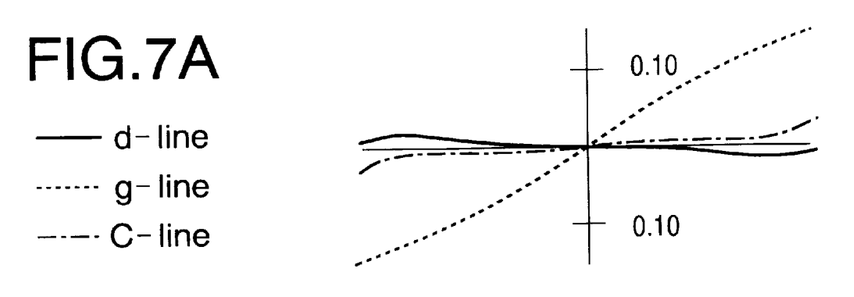
FIG. 7A shows axial coma of the telescopic optical system shown in FIG. 5 when any lenses are not decentered.
Figure 7B:
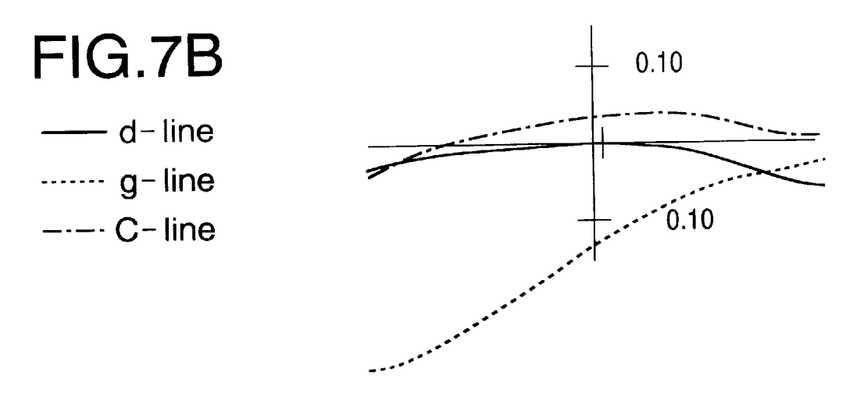
FIG. 7B shows axial coma of the telescopic optical system shown in FIG. 5 when the third lens is decentered to stabilize an image when a tilt angle is 1 degree.

FIG. 7A is a graph showing the axial coma of the telescopic optical system of the first embodiment when the third lens L3 is not decentered, FIG. 7B is a graph showing the axial coma where the third lens L3 is decentered to stabilize the image when the tilt angle due to the hand-held shake is 1 degree. According to the first embodiment, coma can be made smaller, even when the second lens or the third lens is decentered, than the conventional compensation system using a variable angle prism.

Second Embodiment

Figure 8:
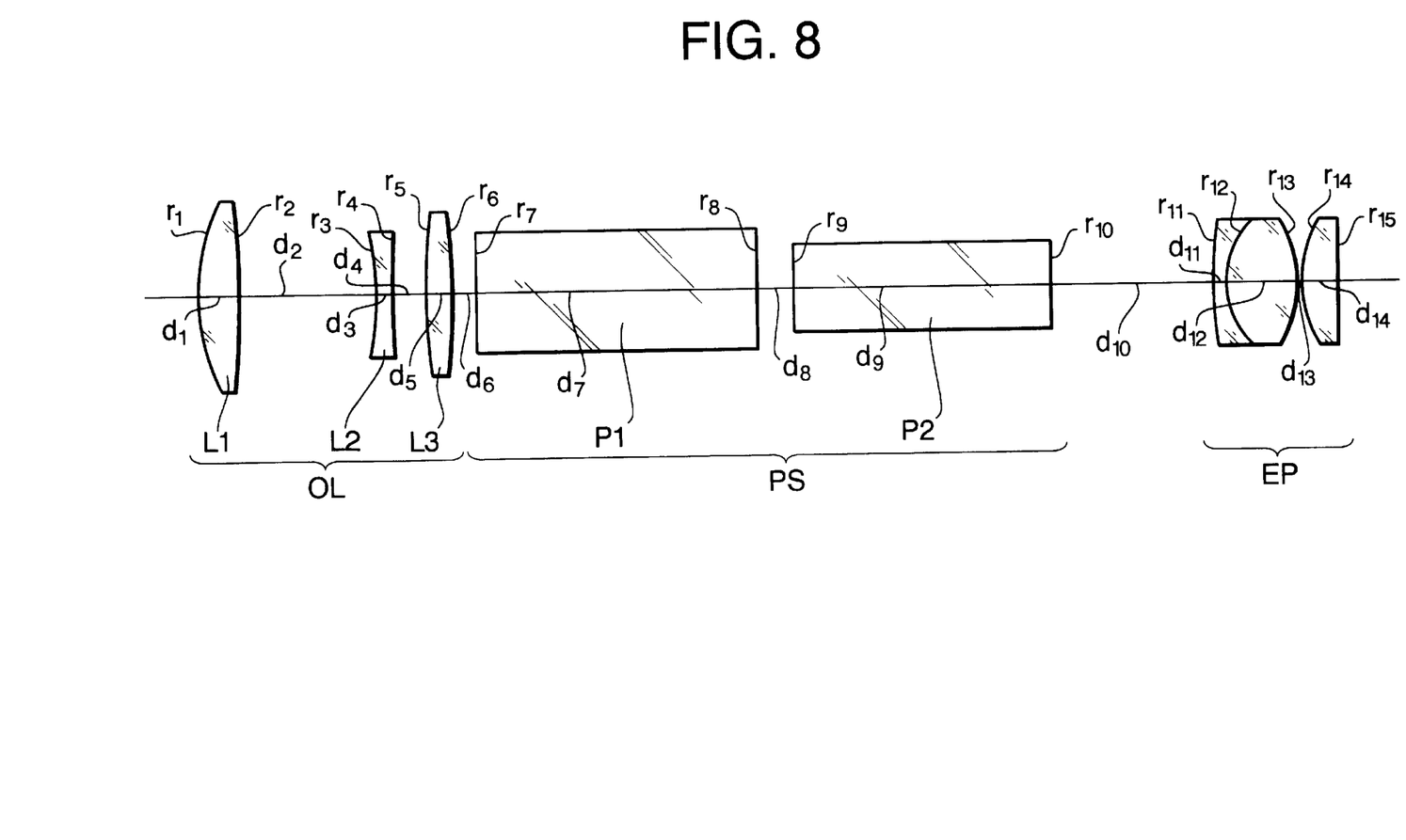
FIG. 8 is a lens diagram showing a telescopic optical system according to a second embodiment.
Figure 9A:
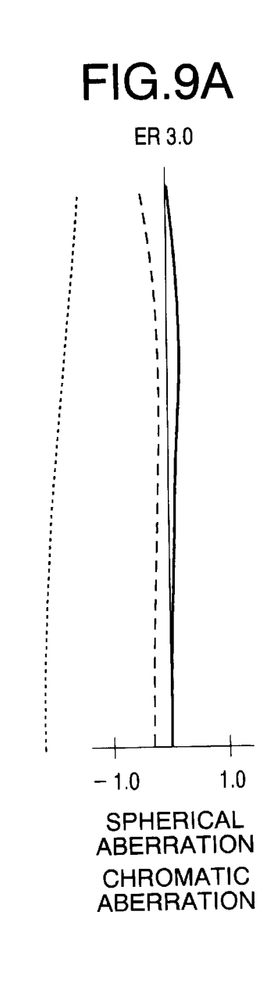
FIGS. 9A through 9D show various aberrations of the telescopic optical system shown in FIG. 8.
Figure 9B:
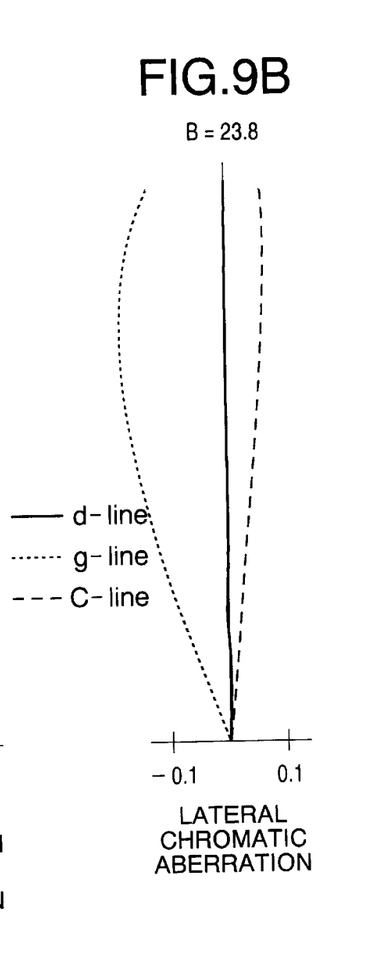
Figure 9C:
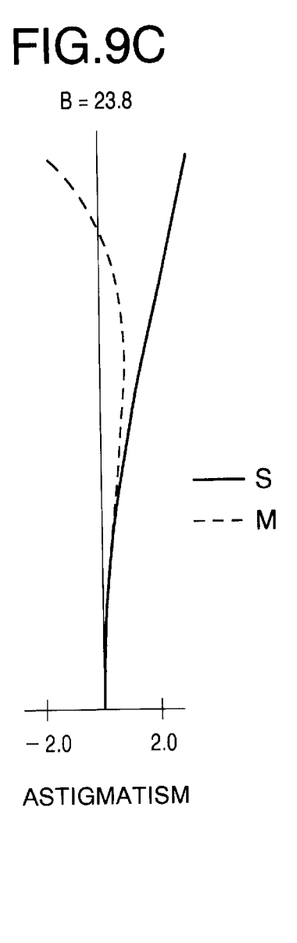
Figure 9D:
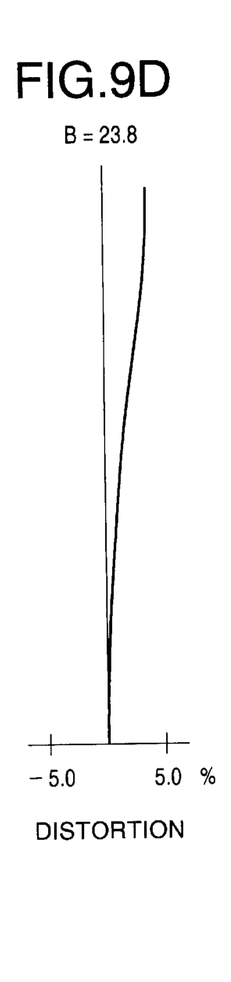

FIG. 8 shows an optical system according to a second embodiment. The numerical construction of the second embodiment is indicated in TABLE 3. The objective optical system OL includes three lenses L1 through L3. The third lens L3 is a compensation lens.

TABLE 3

| Surface Number | r | d | n | vd |
|---|---|---|---|---|
| #1 | 29.748 | 4.800 | 1.51633 | 64.1 |
| #2 | −170.464 | 16.000 | | |
| #3 | −34.268 | 1.800 | 1.71736 | 29.5 |
| #4 | 91.112 | 4.000 | | |
| #5 | 75.895 | 3.00 | 1.52538 | 56.3 |
| #6 | −110.419 | 3.043 | | |
| #7 | INFINITY | 34.000 | 1.56883 | 56.3 |
| #8 | INFINITY | 4.500 | | |
| #9 | INFINITY | 32.000 | 1.56883 | 56.3 |
| #10 | INFINITY | 19.835 | | |
| #11 | 76.731 | 1.500 | 1.80518 | 25.4 |
| #12 | 11.182 | 8.500 | 1.58913 | 61.2 |
| #13 | −17.419 | 0.500 | | |
| #14 | 14.754 | 4.500 | 1.69680 | 55.5 |
| #15 | −3952.463 | — | | |

The object side surface #5 of the third lens L3 is an aspherical surface. The constant K and coefficients $A_4$ are indicated in TABLE 4. The coefficients $A_6$, $A_8$ and $A_{10}$ are equal to zero.

TABLE 4

| 5th surface | K = 0.00000 | $A_4 = -0.15639 \times 10^{-5}$ |

FIGS. 9A through 9D show third order abberrations of the telescopic optical system according to the second embodiment.

Figure 10A:
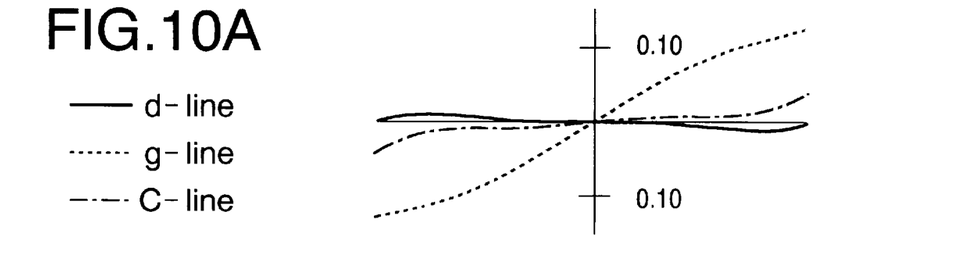
FIG. 10A shows axial coma of the telescopic optical system shown in FIG. 8 when any lenses are not decentered.
Figure 10B:
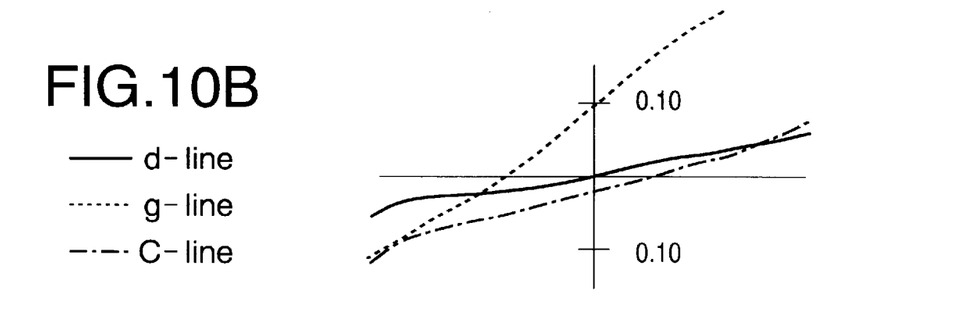
FIG. 10B shows axial coma of the optical system shown in FIG. 8 when the third lens is decentered to stabilize an image when the tilt angle is 1 degree.

FIG. 10A is a graph showing the axial coma of the telescopic optical system of the second embodiment when the third lens L3 is not decentered. FIG. 10B is a graph showing the axial coma when the third lens L3 is decentered to stabilize the image when the tilt angle is 1 degree. In the second embodiment, coma can be made smaller, even when the third lens L3 is decentered, than the conventional compensation system using a variable angle prism.

Third Embodiment

Figure 11:
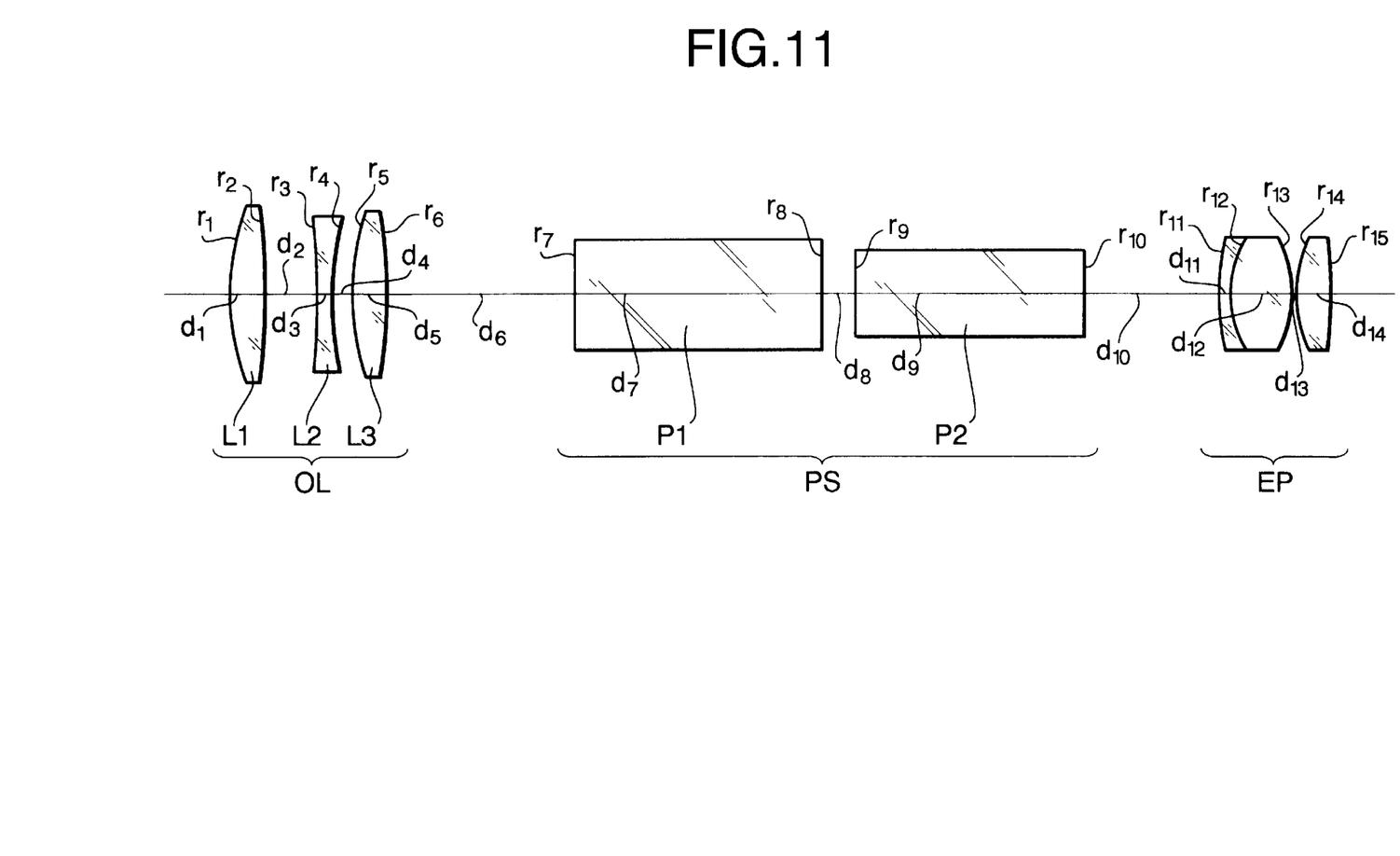
FIG. 11 is a lens diagram showing a telescopic optical system according to a third embodiment.
Figure 12A:
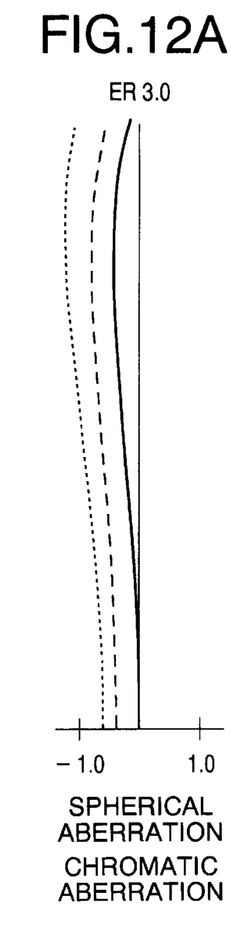
FIGS. 12A through 12D show various aberrations of the telescopic optical system shown in FIG. 11.
Figure 12B:
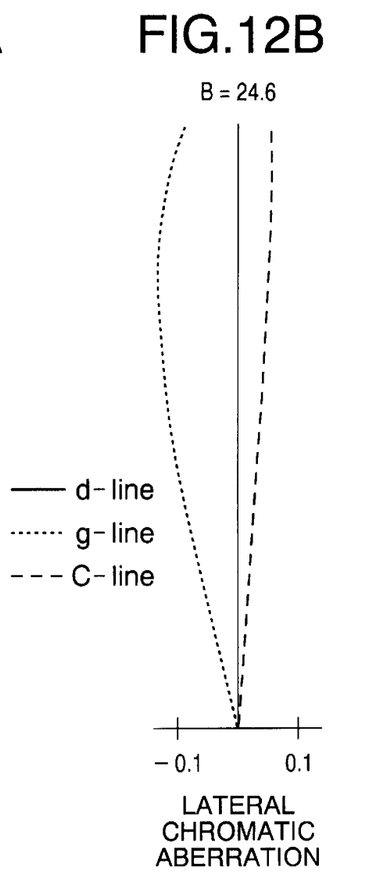
Figure 12C:
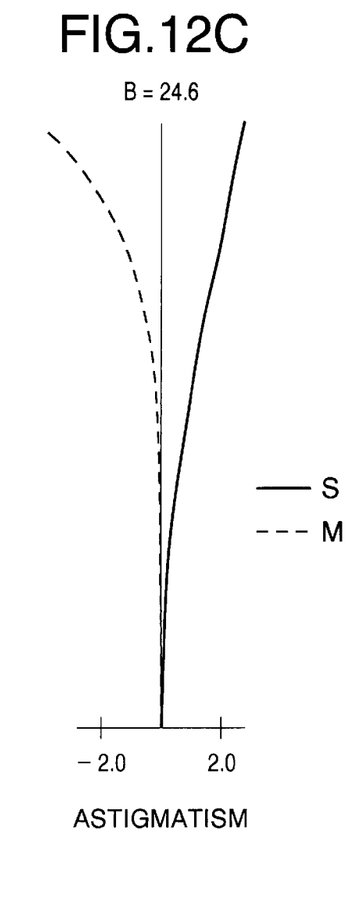
Figure 12D:
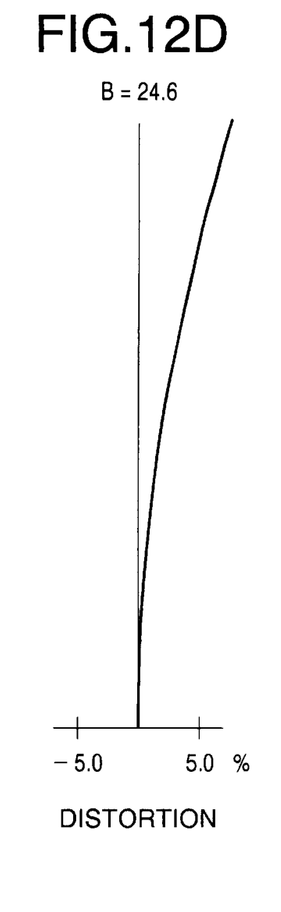

FIG. 11 shows an optical system according to a third embodiment, and the numerical construction thereof is indicated in TABLE 5. The objective optical system OL includes three lenses L1 through L3. The third lens L3 is a compensation lens.

TABLE 5

| Surface Number | r | d | n | vd |
|---|---|---|---|---|
| #1 | 32.417 | 4.800 | 1.51633 | 64.1 |
| #2 | −103.351 | 7.000 | | |
| #3 | −65.705 | 1.800 | 1.73520 | 41.1 |
| #4 | 37.143 | 3.000 | | |
| #5 | 45.151 | 4.000 | 1.49176 | 57.4 |
| #6 | −84.074 | 25.658 | | |
| #7 | INFINITY | 34.000 | 1.56883 | 56.3 |
| #8 | INFINITY | 4.500 | | |
| #9 | INFINITY | 32.000 | 1.56883 | 56.3 |
| #10 | INFINITY | 18.729 | | |
| #11 | 64.332 | 1.500 | 1.80518 | 25.4 |
| #12 | 13.062 | 8.5000 | 1.60311 | 60.7 |
| #13 | −16.703 | 0.500 | | |
| #14 | 18.961 | 4.500 | 1.69680 | 55.5 |
| #15 | −110.195 | — | | |

The object side surface #5 of the third lens L3 is an aspherical surface. The constant K and coefficients $A_4$ are indicated in TABLE 6. The coefficients $A_6$, $A_8$ and $A_{10}$ are equal to zero.

TABLE 6

| 5th surface | K = 0.00000 | $A_4 = -0.25086 \times 10^{-5}$ |
|---|---|---|

FIGS. 12A through 12D show third order aberrations of the telescopic optical system according to the third embodiment.

Figure 13A:
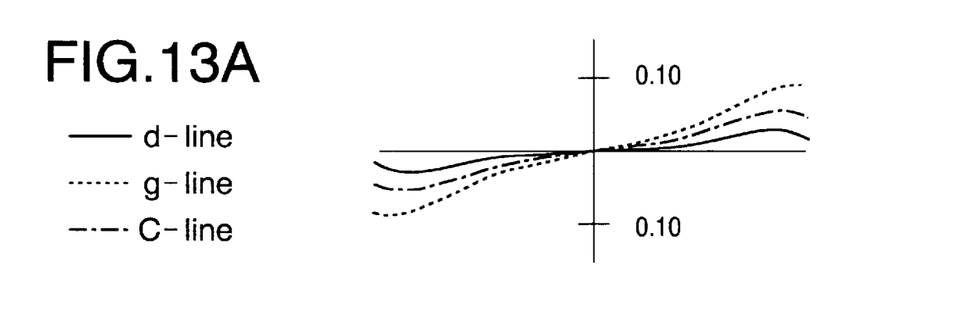
FIG. 13A shows axial coma of the telescopic optical system shown in FIG. 11 when any lenses are not decentered.
Figure 13B:
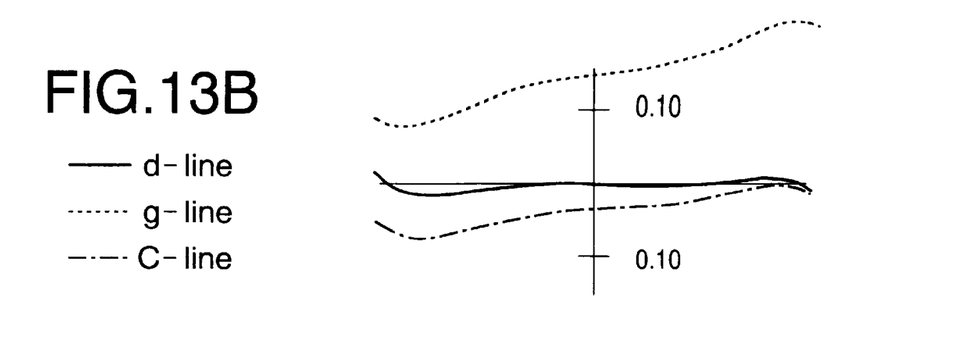
FIG. 13B shows axial coma of the optical system shown in FIG. 11 when the second lens is decentered to stabilize an image when the tilt angle is 1 degree.

FIG. 13A is a graph showing the axial coma of the telescopic optical system of the third embodiment when the third lens L3 is not decentered, and FIG. 13B is a graph showing the axial coma when the third lens L3 is decentered to stabilize the image when the tilt angle is 1 degree. In the third embodiment, coma can be made smaller, even when the third lens L3 is decentered, than the conventional compensation system using a variable angle prism.

TABLE 7 shows the values of the first to third embodiments for conditions (1) and (2).

TABLE 7

|  | First Embodiment | Second Embodiment | Third Embodiment |
|---|---|---|---|
| Condition (1) $d_{12} / f_0$ | 0.11 | 0.15 | 0.07 |
| Condition (2) $\|\tan 1°/(\phi_{13} - \phi_{12})\|$ | 1.76 | 2.49 | 1.30 |

Each of the embodiments satisfies conditions (1) and (2), and is suitable to the telescopic optical system of a binocular having an image-vibration compensation system.

Further, Table 8 provided below provides values for $f_0$, $f_1$, $f_2$, $f_3$, $f_1-f_2$,

TABLE 8

|  | First Embodiment | Second Embodiment | Third Embodiment |
|---|---|---|---|
| $f_0$ | 106.605 | 106.689 | 106.688 |
| $f_1$ | 46.350 | 49.458 | 48.375 |
| $f_2$ | −31.330 | −34.506 | −32.038 |
| $f_3$ | 72.058 | 86.090 | 60.351 |
| $f_1-f_2$ | ∞ | 421.266 | −248.361 |
| $\phi_1$ | 0.02157 | 0.02022 | 0.02067 |
| $\phi_2$ | 0.00000 | 0.00237 | −0.00403 |
| $\phi_3$ | 0.00938 | 0.00937 | 0.00937- |

It should be noted that, in the embodiments, the erected images are observed through the eyepiece EP. The invention is not limited to this particular structure, and is applicable to an observing equipment in which imaging devices (e.g., a CCD: a Charge Coupled Device) and an imaging lenses are used in place of, or in association with the eyepiece EP.

Further, in the above embodiments, the image-vibration compensation system is designed for compensating trembling of the image due to both the vertical and horizontal hand-held shake., However, the system may be designed for compensating the image-vibration in one of these two directions according to uses.

The present invention is directed the optical system of an observing equipment that includes hand-held shake sensors, sensors for detecting the position of the compensation lenses. However, the details of the hand-held shake sensors and/or position detection sensors do not form part of the invention. These are provided to assist in understanding of the invention, and any types of suitable hand-held shake sensors and/or position detecting sensors could be employed to control the driving mechanism for the compensation lenses.

What is claimed is:

1. An optical system for an observing apparatus having an image-vibration compensation system, said optical system including an objective optical system comprising:

a first lens having positive refractive power;

a second lens having negative refractive power; and a third lens having positive refractive power, said lenses being arranged in that order from an object side, wherein said third lens is movable in a direction orthogonal to an optical axis of said objective optical system to compensate for vibration of an image due to a hand-held shake, and wherein the following relationships are satisfied:

$$0.05 < d_{12}/f_0 < 0.20$$

$$0.5 < |\tan 1°/(\phi_{13}-\phi_{12})| < 5.0 \text{ [(unit:mm)]}$$

where, $d_{12}$ is a distance between said first lens and said second lens, $f_0$ is a focal length of said objective optical system, $\phi_{12}$ is a composite power of said first and second lenses, and $\phi_{13}$ is a composite power of said first, second and third lenses.

2. The optical system according to claim 1, wherein said third lens is a plastic lens.

3. The optical system according to claim 1, further comprising eyepiece through which a user observes an image formed by said objective optical system.

4. The optical system according to claim 3, further comprising an erecting system that is located between said objective optical system and said eyepiece.

* * * * *